United States Patent [19]

Sabés

[11] 3,976,189

[45] Aug. 24, 1976

[54] INSTALLATION FOR HANDLING STOCK-PILED FRAGMENTARY MATERIALS

[75] Inventor: Jean Sabés, Anzin, France

[73] Assignee: Societe Anonyme Dite: J. Sabes & Cie, Anzin, France

[22] Filed: Dec. 26, 1974

[21] Appl. No.: 536,398

[30] Foreign Application Priority Data
Jan. 2, 1974    France .............................. 74.00058

[52] U.S. Cl. ............................. 198/36; 198/102; 198/168; 214/10
[51] Int. Cl.² .......................................... B65G 65/28
[58] Field of Search ............. 198/7 R, 11, 102, 168, 198/172, 36, 106; 37/190; 214/10

[56] References Cited
UNITED STATES PATENTS

| | | | |
|---|---|---|---|
| 677,677 | 7/1901 | Messiter............................ | 198/36 X |
| 1,710,801 | 4/1929 | Morgan.............................. | 198/7 R |
| 1,826,840 | 10/1931 | Sylvester........................... | 198/102 |
| 3,381,803 | 5/1968 | Smith................................. | 198/36 X |

FOREIGN PATENTS OR APPLICATIONS

1,208,518    6/1958    France.................................. 198/7

*Primary Examiner*—Robert J. Spar
*Assistant Examiner*—James M. Slattery
*Attorney, Agent, or Firm*—Lewis H. Eslinger

[57] ABSTRACT

A rigid support in the form of a plate rests on a part of the storage area in front of one side of a heap of material in the storage area. The support is positioned parallel to one side of the storage area and extends over the whole width and beyond the heap. At least one endless conveyor fixed rigidly on the support is arranged parallel to the longitudinal side of said support, with its ends also extending beyond the heap. A guiding and tipping ramp is mounted on the support in front of the lateral surface of the conveyor adjacent to the heap of materials to be handled. The height of the ramp is the same as the height of the support and of the conveyor and extends across the whole width of the heap. The support, and the different members mounted thereon, are moved or shifted in at least one direction perpendicular to the length of said conveyor and parallel to the storage area by a drive located outside of the storage area and operating on the support only at its ends. At least one scraping tooth or blade is mounted movably in front of the ramp and is guided by the ramp parallel to the latter as the tooth is moved therealong in order to penetrate into and loosen the base of the materials in the heap front of it. The conveyor is of the scraper type and a retaining beam is mounted on the support parallel to the conveyor, close to the side of the latter, away from the guide ramp. The beam serves to both rigidify the support and hold back and return possible falls of the materials.

18 Claims, 9 Drawing Figures

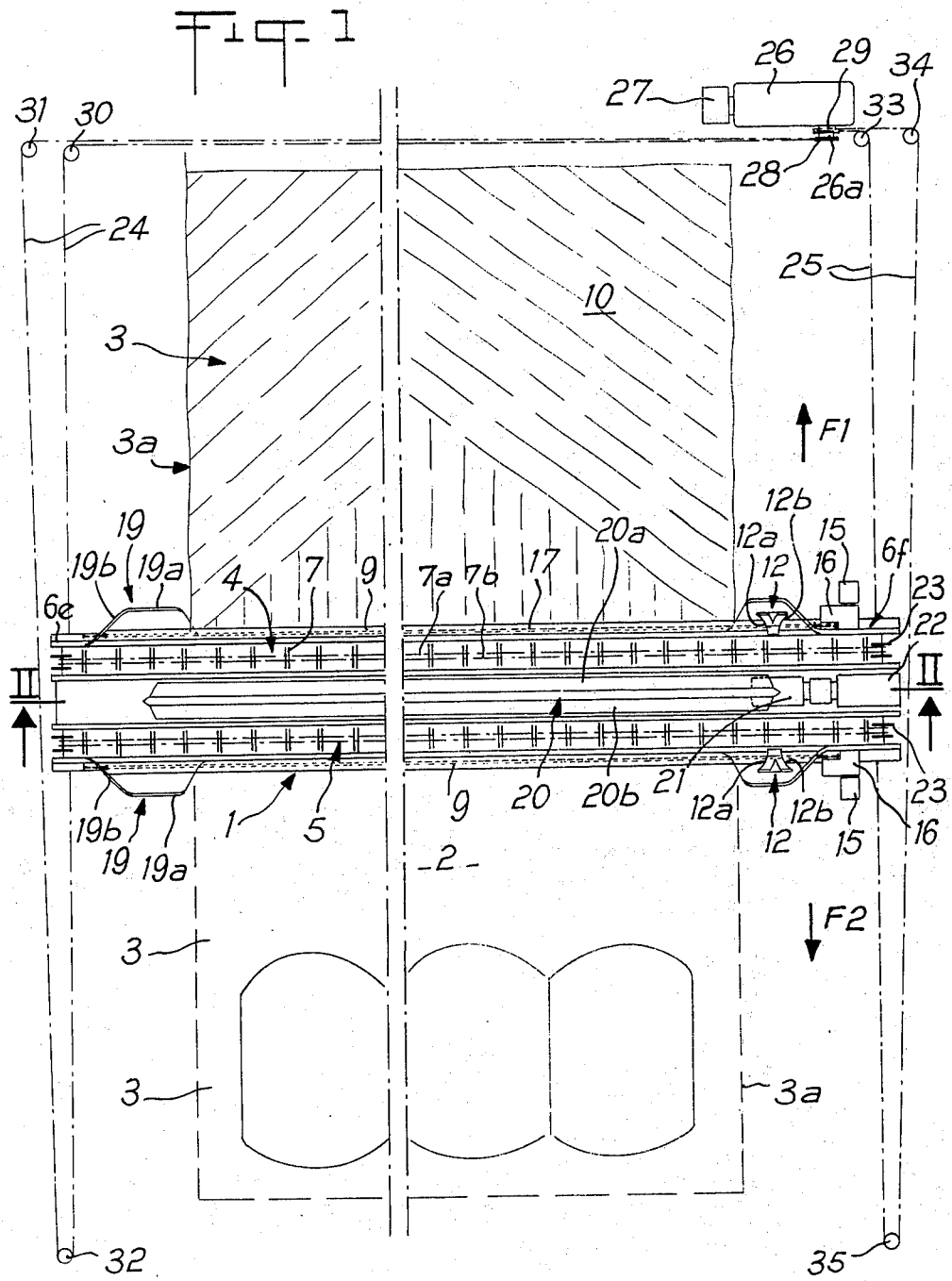

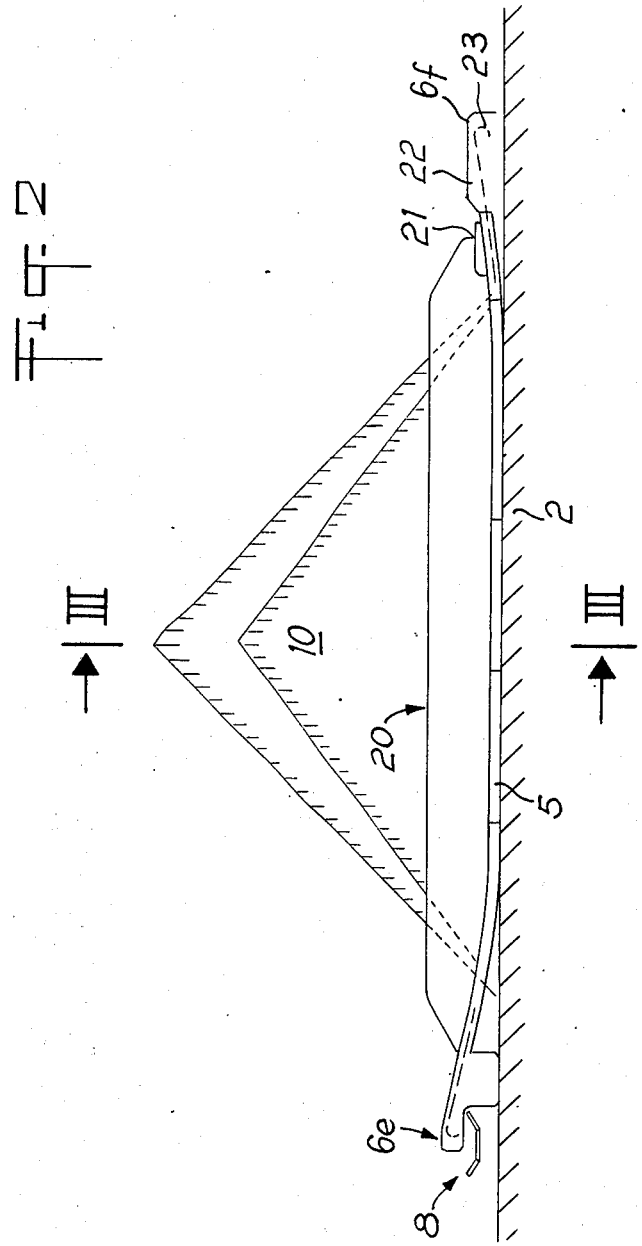

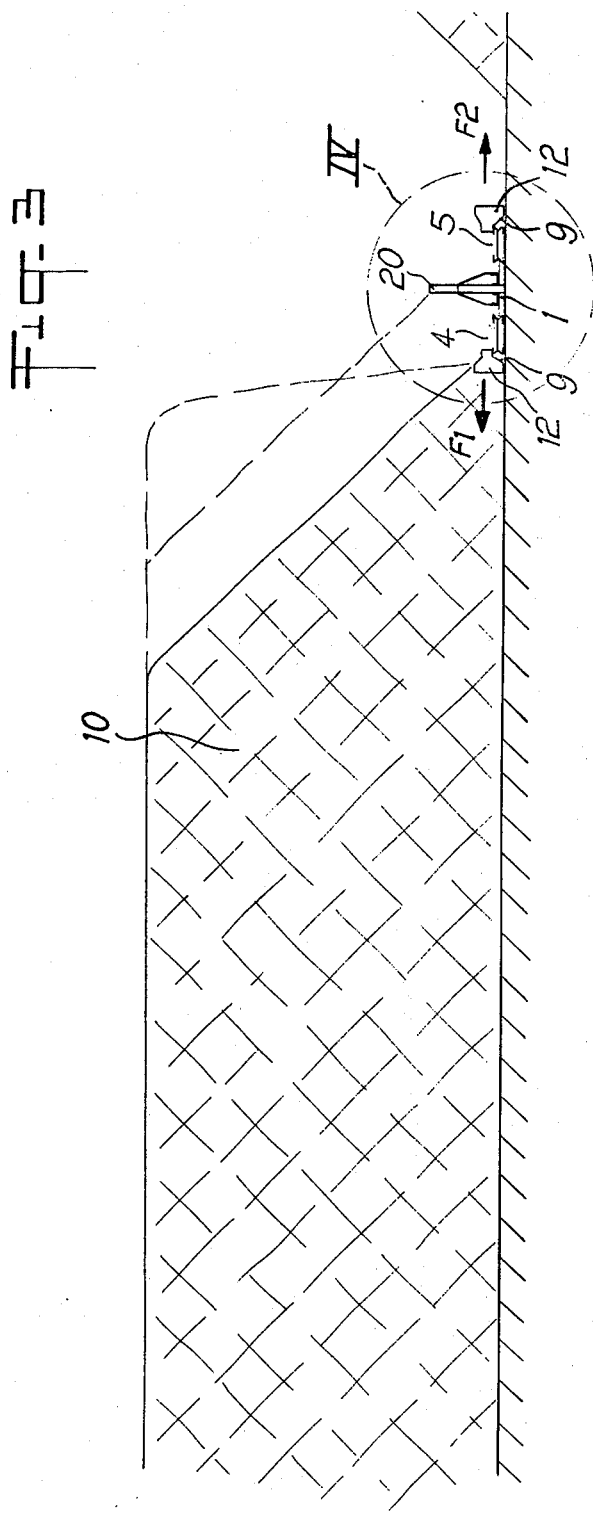

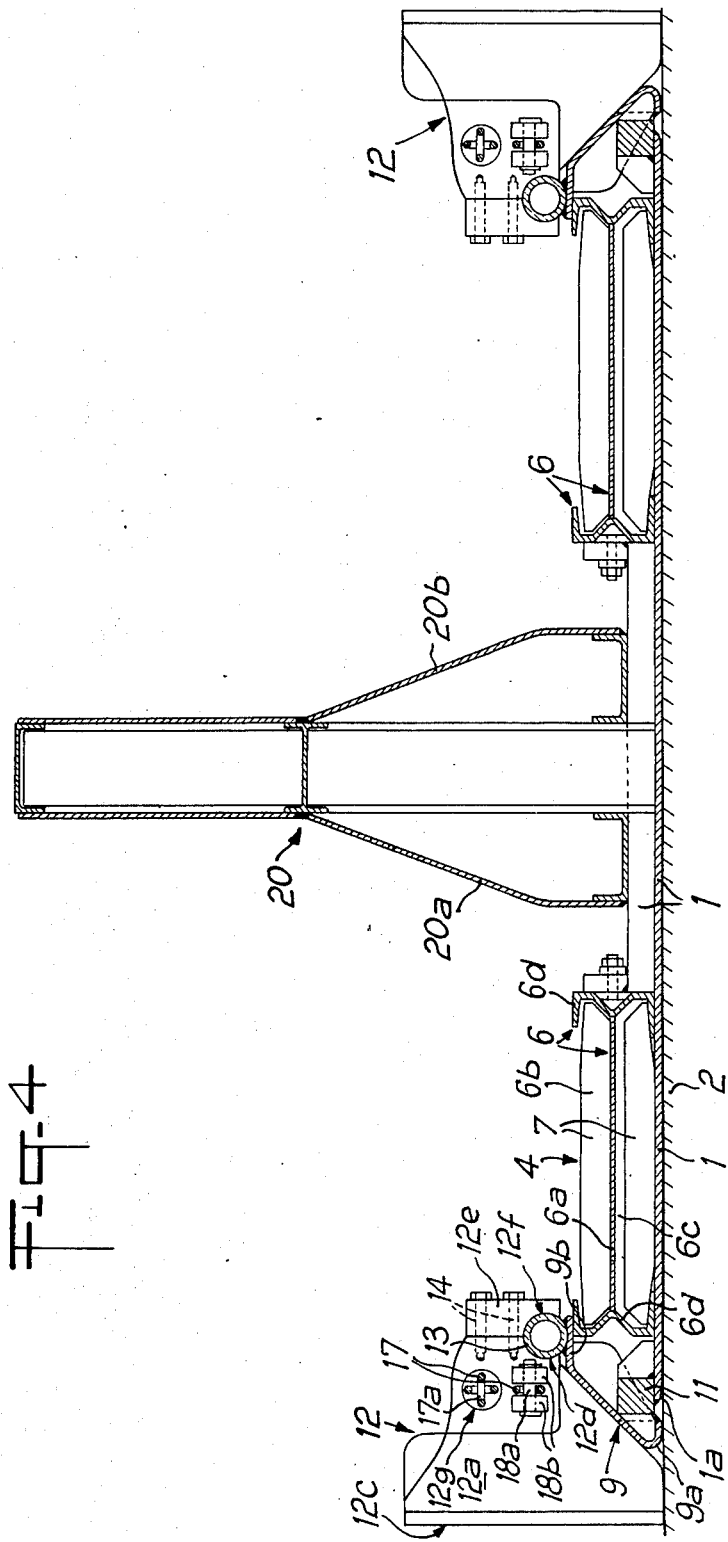

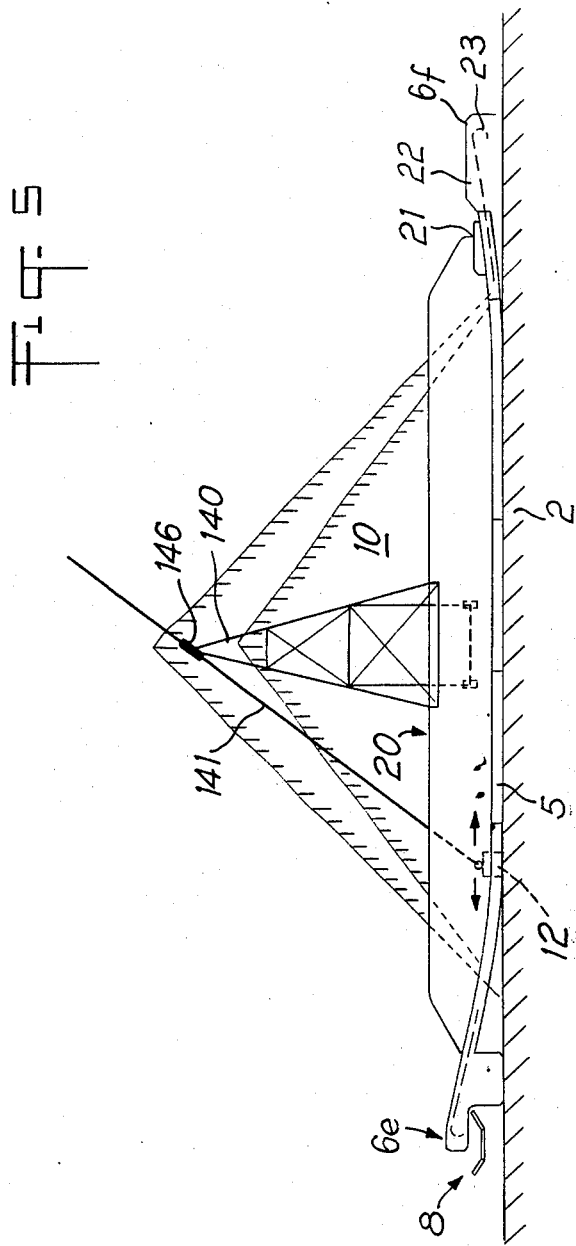

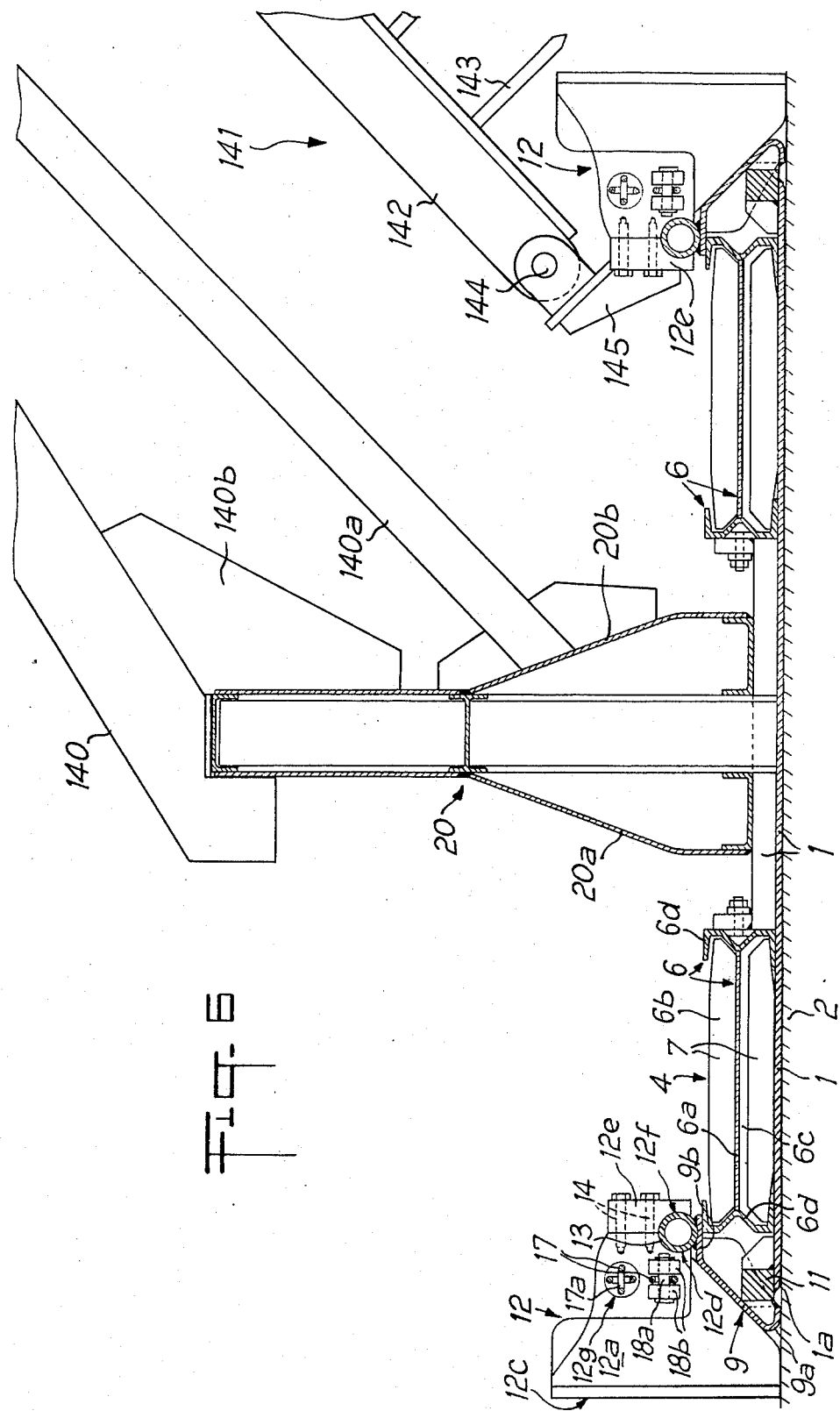

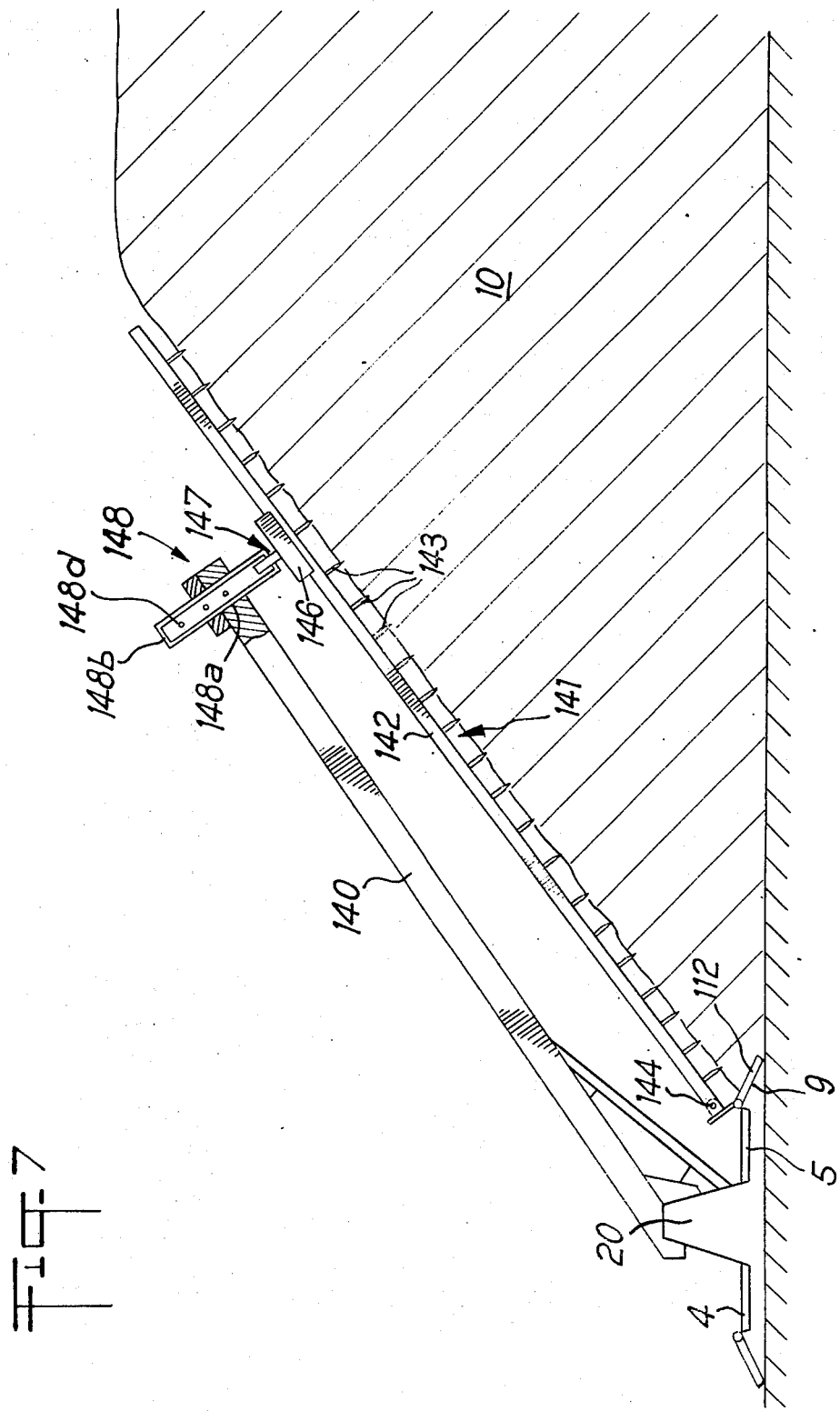

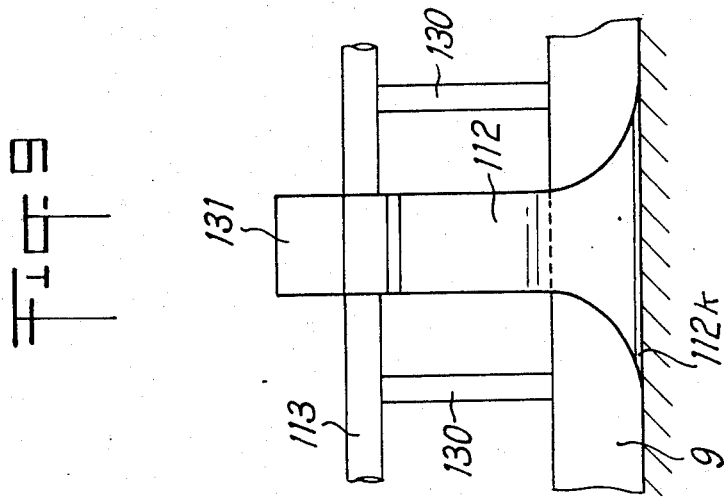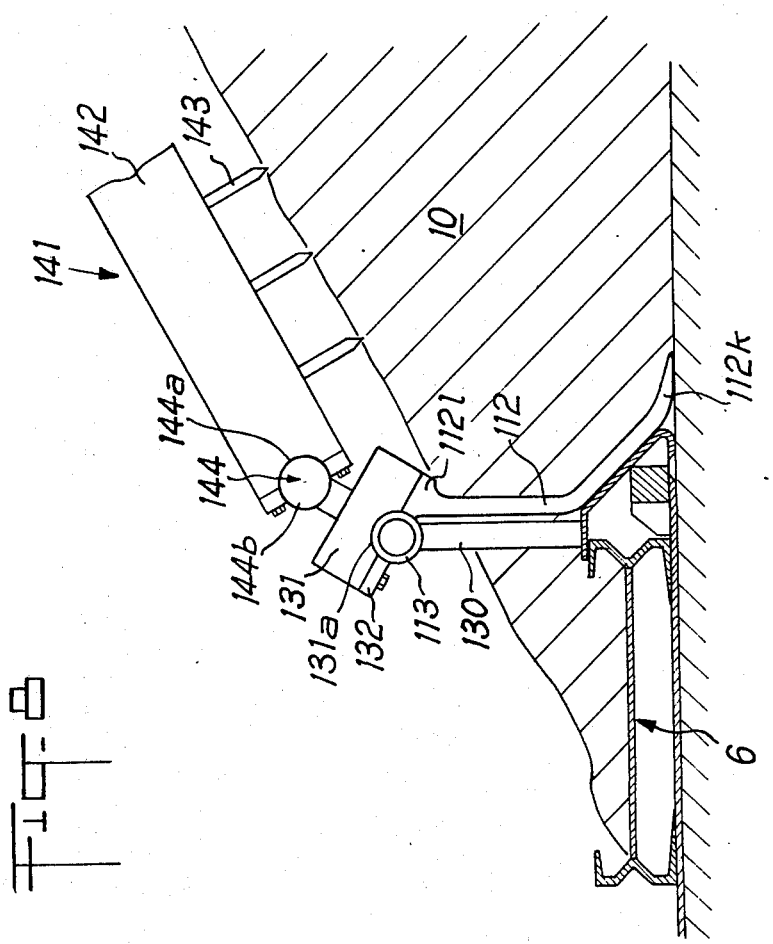

INSTALLATION FOR HANDLING STOCK-PILED FRAGMENTARY MATERIALS

The present invention relates to a handling installation for stocks of fragmentary materials such as mining and quarry products deposited in heaps on a storage area of rectangular shape, said installation being of the type comprising a rigid support in the form of a plate which rests on a part of the storage area in front of one side of the heap of materials and parallel to one side of the storage area and which extends over the whole width and beyond said area; at least one endless conveyor fixed rigidly to the support, arranged parallel to the longitudinal side of said support and arranged in such length that its ends are also outside the storage area; a storage and tipping ramp mounted on the support in front of the lateral surface of the conveyor, said surface being neighboring the heap of materials to be rehandled, this ramp extending, on the one hand over the whole height of the support and of the conveyor, and on the other hand at least over the whole width of the heap, as well as shifting means capable of moving the support and the various members mounted theron, in at least one direction on the one hand perpendicular to the longitudinal extent of said conveyor, and on the other hand parallel to the storage area, these shifting means being provided outside of the storage area and affecting the support or the members fast to said support only at the end zones of the latter.

Such an installation is known in principle through DT-AS No. 1,076,566. The known installation is to be found inside a storage silo which does not permit storage in heaps behind the installations whilst the materials are rehandled from the heap occuring in front of said installation. Through U.S. Pat. No. 1,826,840, a stock rehandling installation is known which permits the deposition of new heaps of materials behind the installation whilst handling the materials occuring in front of the installation. However, by reason of the conception itself of the installation known through U.S. Pat. No. 1,826,840, said installation comprising a plurality of scraping teeth arranged in series one behind the other on a closed chain drawn along a base plate prevents the employment of a loading ramp and would necessitate hiding, in a special device, the upper strand of the chain and of the teeth which are fast thereto. For these reasons, it has been preferred in recent times to have recourse to scoops, bucket wheels, etc., to rehandle the materials in bulk, such as mining and quarry products, stored in the form of heaps, and then to tip the material on to a conveyor belt or transport them directly to the place of subsequent processing, such as a mill, a loading carriage for blast furnaces, etc.

When these known equipments are required to operate at high capacity, they must be dimensioned accordingly. As a result there is an increased need, on the one hand of free working area at the side of the storage area, and on the other hand, of energy for the operation of the equipment.

It is an object of the invention to overcome the above-mentioned drawbacks.

It is another object to provide an installation enabling the rehandling in simple and effective manner of stored materials whilst offering the possibility of restoring materials on the parts of the area freed previously by the installation.

According to the invention in an installation of the type mentioned at the beginning, this purpose is achieved due to the fact that it comprises in addition loosening means which includes, on its lower working edge, at least one tooth or scraping blade, which is mounted movable in front of and guided on the ramp parallel to the latter end and which is arranged so as to be able to penetrate into and loosen the base of the materials occurring in front of it, that said loosening means is associated with drive means capable of moving the loosening means at least in a direction along the guide ramp, that the conveyor is of the scraper type, and that it includes also a retaining beam fixed to the support parallel to the conveyor and close to the side of the latter, the side turned away from the guide ramp, this beam serving at the same time to rigidify the support and to send back possible falls of the materials.

Due to the invention, an installation is provided which takes very little space at the side of the heap of materials to be rehandled and leaves all the space behind it, so that the area freed by the installation can immediately be used for the storage of new material. Besides, the energy necessary for the movement of the whole installation is very small since the movement is effected very slowly and only on the effective run without dead travel, that is to say from one end to the other of the storage area. As regards the energy necessary for the transfer of the materials occuring on the conveyor, it is also small given that it has only to overcome the friction of the scrapers, chains and materials on the fixed parts of the conveyor. As for the energy necessary for the loading of the materials on the conveyor, it is limited to that necessary for driving the installation as a whole very slowly, the major part of the materials being loaded themselves on the conveyor by progressive falling along the natural falling slope of the fragments and under the effect of the penetration of the guiding and tipping ramp into the base of the stored materials. Besides, the energy necessary for driving the loosening means is also very low since the depth of penetration of said means in the case of stored materials is slight.

An embodiment of the invention will be described below purely by way of illustrative and non-limiting example, with reference to the accompanying drawing in which:

FIG. 1 shows a plan view of one embodiment of a handling installation according to the invention;

FIG. 2 is a view in elevation of a vertical section along the plane II—II of FIG. 1;

FIG. 3 is a side view in elevation of a vertical section along the plane III—III of FIG. 2;

FIG. 4 shows in detail and on an enlarged scale the part IV of FIG. 3;

FIG. 5 is a view in elevation of the installation provided with a scraping device;

FIG. 6 is a view in side elevation showing the lower part of the scraping device combined with a loading tooth;

FIG. 7 is a view in side elevation showing the scraping device combined with the loosening means constituted by a scraping plate;

FIG. 8 is a view in side elevation showing a detail of the assembly of the lower part of the scraping device on the loosening means, and FIG. 9 is a view in front elevation of the loosening means according to FIG. 8.

As can be seen more particularly in FIGS. 1 and 4, the rehandling installation comprises a support 1 in the form of a rectangular rigid plate resting on the flat ground 2 of the storage area 3 and extending through its longitudinal sides transversely to the storage are 3 which preferably, has a rectangular perimeter. This support 1 is movable and can slide for example over the ground 2 in two opposite directions $F_1$, $F_2$ and perpendicular to its longitudinal sides $1a$. Of course rails or slides could also be provided extending in the direction of the arrows $F_1$, $F_2$, projecting slightly from the ground 2 and serving to bear the support 1. On this support 1 are mounted in parallel between themselves, and to the longitudinal sides $1a$, two scraper conveyors of known design 4, 5. The ends of these conveyors 4, 5 overlap by some meters, for example 2 to 4 meters the lateral sides $3l$ of the storage are 3. These scraper conveyors 4, 5 comprise troughs 6 which are fixed rigidly on the support and which are sub-divided by an intermediate apron $6a$ into two superposed compartments $6b$, $6c$, of which the lateral sides are bound by profiled elements in the shape of a sigma $6d$. The upper compartment $6b$ serves with the apron $6a$ the scrapers 7 and for example the double central chains $7a$, $7b$ to convey the fragmentary materials loaded on the conveyor, to the tipping end $6e$ where the materials are transferred on to another conveyor for example an endless band conveyor S, perpendicular to the conveyor 4, 5. Given that the principle of the design of scraper conveyors is well-known, which conveyors are notably used in mines, it is not necessary to describe them here in detail. It is however to be mentioned that, in the present embodiment, the tipping end $6e$ of the conveyor 4, 5 can be raised with respect to the part of the conveyor over the storage are 3 in order to permit easy loading of the conveyor 8 which is below this end and extends parallel to the direction of movement of the support 1 and of the conveyors 4, 5.

A guiding and tipping ramp 9 is fixed on the support 1 and the corresponding scraper conveyor 4, 5, on the side situated facing the heap of materials to be rehandled 10, this ramp 9 extending over almost the whole length of the scraper conveyor 4, 5 and in any case beyond the lateral sides $3a$ of the storage area 3. The inclination of the ramp 9 is of the order of 45° in a plane perpendicular to the support 1 and to the conveyor 4, 5. The lower end $9a$ of the ramp which end resting on the ground 2, is rounded and curved and spaced from the conveyor 4, 5 whilst the upper end $9b$ is situated close to the lateral profiled element $6d$ of the conveyor 4, 5 and covers at least a part of this profiled element. The lower end $9a$ of the ramp 9 is fast to the support 1 through fixing blocks 11.

With each guiding and tipping ramp 9 which extends into the base of the stored materials in front of it cooperates a loosening means undermining the lower part of the stack of materials 10, this loosening means being constituted, in the present case, by a double loading tooth 12 whose body rests in part on the ground 2 and in part on the ramp 9.

In other words, in the present case, this loosening means serves not only for loosening the materials at the base of the heap 10 and in front of the ramp 9, but also serves to cooperate with said ramp 9 to load the materials onto the conveyor 4, 5. This double tooth 12 has two incurved loading surfaces $121a$, $12b$ which are arranged symmetrically with respect to the vertical middle plane of the body of the tooth, which plane is perpendicular to the support 1 and to the conveyors 4, 5 and each start from a vertical working edge $12e$, situated in front of the tooth and on the side opposite the corresponding conveyor 4, 5, the lower side of its surfaces $12a$, $12b$ being parallel to the inclined surface of the ramp 9.

Of course, the working edges $12c$ are situated in a same vertical plane parallel to the longitudinal sides $1a$ of the support 1 and of the conveyors 4, 5. The height of the tooth 12 is variable, but as a general rule, it is at least of the order of double the height of the conveyors 4, 5. The body of the tooth 12 is in addition guided by a guiding slide 13 formed for example by a straight hollow cylindrical rod welded on the upper horizontal part $9b$ of the ramp 9. The body of the tooth 12 includes, on its lower rear part, a cylindrical cavity $12d$ which, with a complementary part $12e$ having a corresponding cavity $12f$ adapted to the shape of the rod 13 and fixed on the tooth 12 for example by screws 14, holds the tooth against any tilting.

This tooth 12 is driven by means of an electric motor 15, of a hydraulic coupling assembly with speed reducing gear pressure-limitation 16, and an endless chain 17 which passes around two return yokes arranged laterally at the ends of the conveyor 4, 5. The motor 15 and the assembly 16 are preferably provided on the rear end $6f$ of conveyor 4, 5, that is to say on the end opposite the tipping end $6e$. One of the two strands of the tooth chain 17 is fixed on the tooth 12 by any suitable means for example an axle $18a$ engaged in a chain-link and two fish-plates $18b$ fast to the tooth 12, the other strand $17a$ for example the upper strand passing through a horizontal bore $12g$ of the tooth 12. The direction of rotation of the electric motor 15 of the tooth 12 is determined by end of stroke contactors (not shown) arraged close to the two ends of the conveyor 4, 5 and actuated by the tooth 12 or a member fast to said tooth, such as a lug fixed on the chain 17.

In the end zones situated outside and in the immediate vicinity of the storage area 3, there is advantageously provided a section of counter-ramp 19 in the form of a trough which is open in the direction of the storage area 3 and closed towards the corresponding end of the conveyor 4, 5 and on the outer vertical side $19a$, parallel to say conveyor 4, 5, the inner side of this trough being constituted by the ramp 9. The closed frontal vertical side $19b$ of the trough 19 is arranged on the skew so as to direct the materials towards the end of the conveyor 4, 5 when they are pushed by the tooth 12 which can enter the counter-ramp 19.

The two scraper conveyors 4, 5 are separated from one another, on the side opposite the corresponding ramp 9, by a retaining beam 20 positioned on site and fixed rigidly on the support 1 and extending parallel to the conveyors 4, 5 up to beyond the storage area 3 without however going up to the ends of said conveyors 4, 5. This retaining beam 20 has a sufficient height to prevent the materials coming from falls from the heap 10 from tumbling onto the part of the area previously freed of materials. In general, a beam height of 1.5 meters is sufficient to achieve this purpose. On its lower part, the retaining beam comprises on two sides a return ramp $20a$, $20b$ directed from above to below towards the corresponding conveyor 4, 5. This beam 20 also contributes to the rigidification of the assembly mounted on the support 1.

In the free space between the rear end of the retaining beam 20 and the rear ends of the conveyors 4, 5, that is to say in extension of the beam 20 the support 1 includes the drive motor 21 of the one or more conveyors 4, 5, the speed reducing gear 22 and the elastic couplings, such as hydraulic couplings, capable of connecting one of the output shafts of the reducing gear 22 to the corresponding drum or return yoke 23 of the conveyor 4, 5. In addition, a container for hydraulic liquid, a hydraulic pump, its electric drive motor and the hydraulic circuits going to the various hydraulic couplers associated with the drive motors of the conveyor 4, 5 or the teeth 12, can be placed there.

As shifting means for the movement of the support 1 on the ground 2 perpendicularly to the lateral sides 1a of said support, there is provided, in this embodiment, two endless shifting chains 24, 25, a winch 26, a hydraulic motor-reducing gear 27 capable of driving the winch at variable speeds in one or other direction of rotation, a hydraulic generating plant (not shown) and equipped with a variable displacement pump acting on the motor 27, two identical yokes 28, 29 keyed on the same output shaft 26a of the winch 26 and for each chain 24, 25 at least three return gear wheels at fixed positions 30, 31, 32 and 33, 34, 35. Each chain 24, 25 is fast to one of the ends of the support 1 and extends principally outside of the field of travel of the support 1 and hence outside the storage area 3 in a direction parallel to the movement of said support 1. The three return wheels 30, 31, 32 and 33, 34, 35 are arranged at the ends of the lateral sides of the field of travel of the support 1, whilst the winch 26 and the other equipment 27, 28, 29 are provided at one of the frontal sides of the field of travel of the support, hence at one of the front sides of the storage area 3. The winch 26 is arranged so that the yokes 28, 29 are in planes substantially parallel to the front sides of the storage area 3. Two of the three idling toothed wheels 30 to 32 and 33 to 35 are substantially in the same vertical plane passing through the corresponding yoke 28, 29 whilst the third castor wheel 32 or 35 is at the side of the storage area 3, the side opposite the winch 27.

In FIG. 1, it is seen that the shifting chain 24 associated with the yoke 28 passes from the left end of the support 1 around the first castor wheel 30 onto the yoke 28, then onto the second castor wheel 31 close to the first 30 and, after having passed along the whole lateral side of the storage area 3, around the third castor wheel 32 located at the other end of the filed of travel of the support before coming back to the support 1. The other chain 25 has a similar course as can be seen from FIG. 1. It is of little importance that the winch 24 be closer to one castor wheel than the other, given that the identical yokes 28, 29 move the support 1 by an equal amount of travel, whatever the length of the shifting chains 24, 25.

In place of a loading tooth, the loosening means can be constituted by a simple scraper plate 112 which is guided by one of its surfaces along the ramp 9 and which presents at its lower working edge at least one tooth or scraping blade 112k extending at the level of the lower end of the ramp parallel to and in front of the latter so as to be able to penetrate to a slight depth into the base of the heap of materials 10 (see FIGS. 8 and 9). At its upper end, the scraper plate 112 is mounted on the guiding slide in the form of a hollow rod 113 above the upper end of the ramp 9 at a sufficient distance to enable the passage of the materials of the stack 10 between it and the ramp 9. The slide 113 is fixed on the horizontal upper part of the ramp 9 by means of regularly spaced risers 130.

A support part 131 having a semi-cylindrical cavity 131a rests on the side 113 and is screwed, on the one hand to the upper enlarged end 112l of the scraper plate 112, this enlarged end being applied to a part of the slide 113 in the same way as a complementary part 132 which is also applied against a part of the slide 113 and screwed onto the support part 131 so that the assembly, support part 131, enlarged end 112l and complementary part 132, constitute a guiding sheath around to slide 113 and surrounds it over a circular arc greater than 180° (FIG. 8).

In order to control the falls of material which results from removing products at the base of the storage heap 10 and the creation of parts overhanging in height, which falls cause considerable overloads of the removal conveyor and can even cause blocking of the latter. However even if the removal conveyor is not blocked by uncontrolled falls, the regularity of delivery of the conveyor is destroyed, which may be considered unacceptable at the place of use of the materials.

In order to eliminate these drawbacks, there is associated with the stock handling installation a scraper device to cause the surface of the heap of materials to undergo continuous and controlled flow of the materials along a line of greatest slope towards the guiding and tipping ramp 9 of the installation.

As can be seen in FIGS. 5 to 8, the scraping device comprises at least one support boom 140 mounted at a fixed position by its lower end on the central part of the retaining beam 20. The support beam extends laterally in a plane perpendicular to the beam 20 and to the conveyor 4, 5 in the direction of the heap of materials 10 with an inclination with respect to the horizontal preferably at least slightly greater than the angle of natural slope of the materials stored on the heap 10. The scraper device comprises in addition a comb 141 composed of a small beam 142 and a plurality of spikes 143 fixed on said small beam perpendicularly to its longitudinal surface situated facing the ground and hence facing the heap 10. At its lower end, the small beam 142 of the comb 141 includes half of a ball joint 144, for example the spherical housing 144a whose other half, for example the spherical ball 144b is fast to the support part 131 fixed to the scraper plate 112 (FIG. 8) or to a support part 145 fixed to the complementary part 12e of the tooth 12 (FIG. 6).

The upper part of the comb beam is mounted axially sliding in a guiding sheath 146 suspended at the upper part of the boom 140 which, in its lower part, is supported on the retaining beam 20 by means of cross members 140a and support flanges 140b. The guide sheath 146 is suspended at the upper end of the boom by a means of a cardan joint or by a ball joint 147 of which a part is fixed in a position adjusting unit 148. This position adjusting unit 148 comprises for example a recess 148a formed in the upper end of the boom 140 so that its axis is parallel to the spikes 143, a suspension area 148b housed partly in said recess 148a and extending beyond each side of said boom 140 as well as position adjusting means for the arm 148b with respect to the recess 148a. These adjusting means can consist of holes 148d formed in the arm 148b perpendicular to its longitudinal extension and a locking bolt capable of penetrating into one of said holes and into a hole formed in the boom 140, at the side of the housing recess 148a. These adjusting means enable the slope of the comb 141 to be adapted to the variation in the natural slope or the equilibrium angle of the heap of materials 10 so as to maintain the scraper comb 141 always slightly more slanted than the natural slope and to thus preserve easy conditions of flow for the materials.

The mode of operation of the scraper device is easily understood. When the loosening means 12 or 112 moves along the heap 10, the lower end of the comb 141 follows this movement whilst its upper part is moved longitudinally in the sheath 146 whilst pivoting around the ball joint 147. Thus the spikes 143 constantly scrape the sloped surface of the heap 10 and cause a slight tumbling of materials towards the ramp 9 and the conveyor 4, 5.

I claim:

1. Apparatus for handling stock-piled fragmentary materials such as products of mines and quarries arranged in heaps over a storage area of generally rectangular shape, said apparatus comprising a rigid support plate adapted to rest on a part of the storage area in front of one side of the heap of material, parallel to one side of the storage area, with the support plate extending over the whole width of and beyond the storage area occupied by the heap; at least one endless conveyor mounted on the support plate parallel to the longitudinal side of said support plate; said conveyor having a length substantially equal to the length of the support plate; a guiding and tipping ramp mounted on said support plate adjacent the conveyor on the side thereof facng the heap of materials to be handled, said ramp extending along said support plate for a predetermined length at least as great as the width of the heap to be handled and having a height which is substantially equal to the height of the support plate and conveyor; shifting means for moving said support plate and conveyor thereon in at least one direction perpendicular to the length of the conveyor and parallel to the storage area; said shifting means being located outside of the storage area and being operatively connected to said support plate at the ends thereof; loosening means mounted on said support plate including at least one scraping means movably mounted in said apparatus in front of and slidably engaged with said ramp, said scraper means being guided by said ramp for movement parallel to the ramp for penetrating into and loosening the base of the material in a heap in front of the ramp, and drive means for moving said scraping means in at least one direction along the guide ramp; a retaining beam fixed on the support plate parallel to said conveyor and adjacent to the side of the conveyor opposite from said guide ramp, said beam serving to rigidify the support and to hold back and return possible falls of materials beyond the conveyor; and a guide slide for said scraper means comprising a straight rod secured to the horizontal upper portion of said guide ramp, said loosening means including means for slidably mounting the scraper means on the rod and at least partly surrounding the rod whereby said scraper means is guided in its movement by engagement with said guide ramp and by said rod and any tilting or wedging of the scraper means with respect to the ramp and to the guide slide is prevented.

2. Apparatus according to claim 1 wherein the scraping means includes two working edges of which one acts in one and the other in the other of two opposite directions of movement of said scraping means along the ramp.

3. Apparatus according to claim 1, wherein the drive means for said scraper means includes an endless chain attached to said scraper means and passing to the ends of the conveyor around two return yokes, one of which is driven by a motor through a reducing gear, and contact means mounted close to the end of the conveyor for engaging said scraper means and reversing the direction of operation of the motor of the scraper means.

4. Apparatus according to claim 1, and comprising a second handling unit, said second handling unit being arranged symmetrically to the first with respect to the retaining beam and comprising a conveyor fixed rigidily to the support, a guiding and tipping ramp mounted on the side of the conveyor turned away from the retaining beam, loosening means and drive means for the second loosening means.

5. Apparatus according to claim 1, wherein the scraper means comprises plough-share means for cooperating with the ramp to load the materials on to the conveyor.

6. Apparatus according to claim 5, wherein the loading plough-share means comprises a double tooth blade having loading surfaces arranged symmetrically with respect to the middle plane of the double tooth blade, said plane being perpendicular to the support plate, to the ramp and to the conveyor.

7. Apparatus according to claim 1, wherein adjacent the end zones of said support plate located outside the storage area occupied by the heap, the guide ramp has a section of counter-ramp arranged to receive the scraper means and serve as a tipping abutment directing towards the conveyor the fragments pushed by the scraper means on to said counter-ramp.

8. Apparatus according to claim 1, wherein one end of the conveyor is raised with respect to the other parts of said conveyor to overhang above another conveyor.

9. Apparatus according to claim 1, wherein the guide slide is located above the upper part of the guide ramp and is fixed thereto by means of risers regularly spaced along said ramp.

10. Apparatus according to claim 1, including means for scraping the stored materials located above said scraper means.

11. Apparatus as defined in claim 1, wherein said straight rod is a hollow cylindrical rod, 12. Apparatus for handling stock-piled fragmentary materials such as products of mines and quarries arranged in heaps over a storage area of generally rectangular shape, said apparatus comprising a rigid support plate adapted to reset on a part of the storage area in front of one side of the heap of material, parallel to one side of the storage area, with the support plate extending over the whole width of and beyond the storage area occupied by the heap; at least one endless conveyor mounted on the support plate parallel to the longitudinal side of said support plate; said conveyor having a length substantially equal to the length of the support plate; a guiding and tipping ramp mounted on said support plate adjacent the conveyor on the side thereof facing the heap of materials to be handled, said ramp extenuing along said support plate for a predetermined length at least as great as the width of the heap to be handled and having a height which is substantially equal to the height of the support plate and conveyor; shifting means for moving said support plate and conveyor thereon in at least one direction perpendicular to the length of the conveyor and parallel to the storage area; said shifting means being located outside of the storage area and being operatively connected to said support plate at the ends thereof; loosening means mounted on said support plate including at least one scraping means movably mounted in said apparatus in front of and slidably engaged with said ramp, said scraper means being guided by said ramp for movement parallel to the ramp for penetrating into and loosening the base of the material in a heap in front of the ramp, and drive means for moving said scraping means in at least one direction along the guide ramp; a retaining beam fixed on the support plate parallel to said conveyor and adjacent to the side of the conveyor opposite from said guide ramp, said beam serving to rigidify the support and to hold back and return possible falls of materials beyond the conveyor; and drive means for said conveyor including a drive motor and a speed reducing gear having an output shaft located in alignment with said retaining beam, as an extension thereof, operatively connected to said conveyor for driving the conveyor, said conveyor including a return drum aligned with the output shaft of the reducing gear; and elastic coupling means comprising a hydraulic coupler including a pressure limiter, for coupling said output shaft to said return drum.

13. Apparatus according to claim 12, wherein said drive means for said scraper means includes elastic coupling means comprising an hydraulic coupler including a pressure limiter mounted in the apparatus at the same end of the conveyor as the drive motor of the conveyor and on the side of the conveyor opposite the beam.

14. Apparatus for handling stock-piled fragmentary materials such as products of mines and quarries arranged in heaps over a storage area of generally rectanglar shape, said apparatus comprising a rigid support plate adapted to rest on a part of the storage area in front of one side of the heap of material, parallel to one side of the storage area, with the support plate extending over the whole width of and beyond the storage area occupied by the heap; at least one endless conveyor mounted on the support plate parallel to the longitudinal side of said support plate; said conveyor having a length substantially equal to the length of the support plate; a guiding and tipping ramp mounted on said support plate adjacent the conveyor on the side thereof facing the heap of materials to be handled, said ramp extending along said support plate for a predetermined length at least as great as the width of the heap to be handled and having a height which is substantially equal to the height of the support plate and conveyor; shifting means for moving said support plate and conveyor thereon in at least one direction perpendicular to the length of the conveyor and parallel to the storage area; said shifting means being located outside of the storage area and being operatively connected to said support plate at the ends thereof; loosening means mounted on said support plate including at least one scraping means movably mounted in said apparatus in front of and slidably engaged with said ramp, said scraper means being guided by said ramp for movement parallel to the ramp for penetrating into loosening the base of the material in a heap in front of the ramp, and drive means for moving said scraping means in at least one direction along the guide ramp; a retaining beam fixed on the support plate parallel to said conveyor and adjacent to the side of the conveyor opposite from said guide ramp, said beam serving to rigidify the support and to hold back and return possible falls of materials beyond the conveyor; said shifting means comprising a pair of chains respectively operatively connected with opposite ends of the support plate; a winch, motor-reducing gear means for driving said winch in one or other direction of rotation; said winch having an output shaft, and being positioned with respect to the support plate with output shaft parallel to the direction of movement of the support plate, yoke means for drivingly connecting said chains to the output shaft of the winch and, and at least three gear wheels associated with each of said chains, said gear wheels cooperating with the meshes of the chains and being arranged on the same longitudinal side at two of the four corners of the field of travel of the support plate, at least two of the three return gear wheels associated with each chain being arranged substantially in the plane of the yoke means associated with the same chain.

15. Apparatus for handling stock-piled fragmentary materials such as products of mines and quarries arranged in heaps over a storage area of generally rectangular shape, said apparatus comprising a rigid support plate adapted to rest on a part of the storage area in front of one side of the heap of material, parallel to one side of the storage area, with the support plate extending over the whole width of and beyond the storage area occupied by the heap; at least one endless conveyor mounted on the support plate parallel to the longitudinal side of said support plate; said conveyor having a length substantially equal to the length of the support plate; a guiding and tipping ramp mounted on said support plate adjacent the conveyor on the side thereof facing the heap of materials to be handled, said ramp extending along said support plate for a predetermined length at least as great as the width of the heap to be handled and having a height which is substantially equal to the height of the support plate and conveyor; shifting means for moving said support plate and conveyor thereon in at least one direction perpendicular to the length of the conveyor and parallel to the storage area; said shifting means being located outside of the storage area and being operatively connected to said support plate at the ends thereof; loosening means mounted on said support plate including at least one scraping means movably mounted in said apparatus in front of and slidably engaged with said ramp, said scraper means being guided by said ramp for movement parallel to the ramp for penetrating into and loosening the base of the material in a heap in front of the ramp, and drive means for moving said scraping means in at least one direction along the guide ramp; a retaining beam fixed on the support plate parallel to said conveyor and adjacent to the side of the conveyor opposite from said guide ramp, said beam serving to rigidify the support and to hold back and return possible falls of materials beyond the conveyor; said loosening means including at least one support boom mounted at one end on a central portion of the retaining beam and extending laterally in a plane perpendicular to said beam and to the conveyor with an inclination with respect to the horizontal that is slightly greater than the angle of natural slope of the heap being handled; and a scraper comb having a lower end pivotally mounted on said loosening means and an upper and pivotally mounted on said boom.

16. Apparatus according to claim 15 wherein said boom includes a slide sheath pivotally mounted on the upper end thereof and said scraper comb is slidably mounted in said sheath.

17. Apparatus according to claim 16 including means for adjustably mounting said slide sheath on said boom to vary the position of said sheath with respect to the boom thereby to vary the angle of inclination of said scraper comb.

18. Apparatus for handling stock-piled fragmentary material such as products of mines and quarries arranged in heaps over a storage area of generally rectangular shape, said apparatus comprising a rigid support plate adapted to rest on a part of the storage area in front of one side of the heap of material, parallel to one side of the storage area, with the support plate extending over the whole width of and beyond the storage area occupied by the heap; at least one endless conveyor mounted on the support plate parallel to the longitudinal side of said support plate; said conveyor having a length substantially equal to the length of the support plate; a guiding and tipping ramp mounted on said support plate adajcent the conveyor on the side thereof facing the heap of materials to be handled, said ramp extending along said support plate for a predetermined length at least as great as the width of the heap to be handled and having a height which is substantially equal to the height of the support plate and conveyor; said ramp being inclined downwardly from a position adjacent the conveyor towards the ground adjacent the adjacent heap of material; shifting means for moving said support plate and conveyor thereon in at least one direction perpendicular to the length of the conveyor and parallel to the storage area; said shifting means being located outside of the storage area and being operatively connected to said support plate at the ends thereof; loosening means mounted on said support plate including at least one scraping means movably mounted in said apparatus in front of and slidably engaged with said ramp, said scraper means being guided by said ramp for movement parallel to the ramp for penetrating into and loosening the base of the material in a heap in front of the ramp and for cooperating with said ramp to guide material from the heap onto the ramp and into the conveyor, and drive means for moving said scraping means in at least one direction along the guide ramp; a retaining beam fixed on the support plate parallel to said conveyor and adjacent to the side of the conveyor opposite from said ramp, said beam serving to rigidify the support and to hold back and return possible falls of materials beyond the conveyor.

* * * * *